Jan. 22, 1952   V. EY   2,582,974
VALVE FOR FLUID PRESSURE REGULATORS
Filed Dec. 9, 1946   2 SHEETS—SHEET 1

INVENTOR.
VICTOR EY
BY Clark Ott
ATTORNEYS.

Jan. 22, 1952 V. EY 2,582,974
VALVE FOR FLUID PRESSURE REGULATORS
Filed Dec. 9, 1946 2 SHEETS—SHEET 2
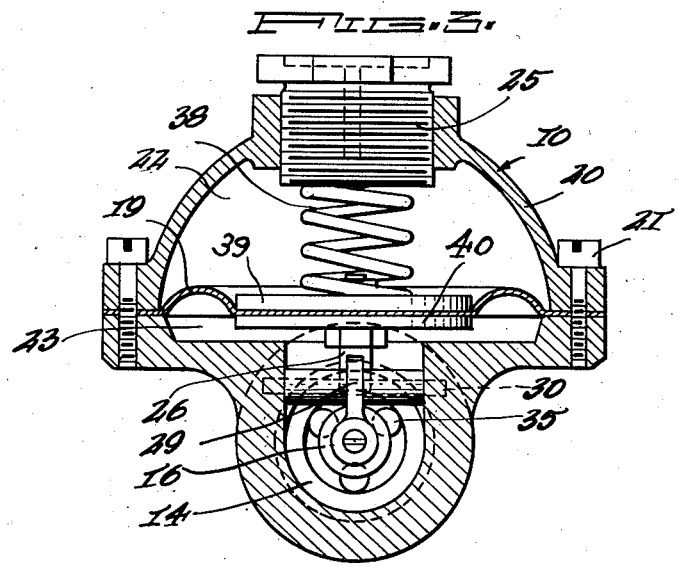
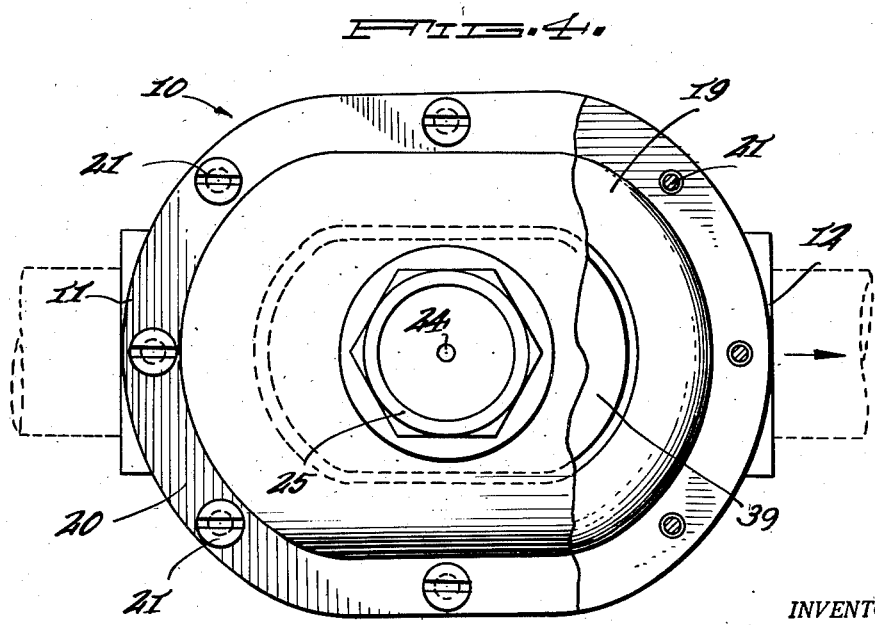
INVENTOR.
*Victor Ey.*
BY *Clark & Ott*
ATTORNEYS.

Patented Jan. 22, 1952

2,582,974

UNITED STATES PATENT OFFICE 2,582,974

VALVE FOR FLUID PRESSURE REGULATORS

Victor Ey, Woodside, N. Y.

Application December 9, 1946, Serial No. 715,030

4 Claims. (Cl. 251—27)

This invention relates to valves and while not limited thereto the same has particular reference to a fluid pressure regulator valve acting in response to change of pressure to move the valve elements thereof in accordance with requirements.

The invention comprehends a valve of said character adapted for use as a gas pressure regulator for burners, water heaters, space heaters and the like and oxygen supply for acetylene flame and the like and which is constructed and arranged for tight fitting engagement of the valve element against the seat for insuring a complete cutting off of the gas supply when in closed relation.

The invention has for a further object the provision of a valve acting in response to pressure differential on opposite sides of a diaphragm through a toggle connection with the valve element for providing maximum pressure of the valve element against its seat.

The invention also has for an object the provision of a valve element mounted for guided reciprocatory movement as well as universal pivotal and swinging movements thereof so as to provide a freely moving valve element and avoid sticking or freezing thereof.

With the foregoing and other objects in view, reference is now made to the following specification and accompanying drawings in which the preferred embodiment of the invention is illustrated.

In the drawings:

Fig. 3 is a transverse medial vertical sectional view with the operating part shown in full.

Fig. 4 is a top plan view thereof with parts broken away in order to show the underlying construction.

Figure 1:
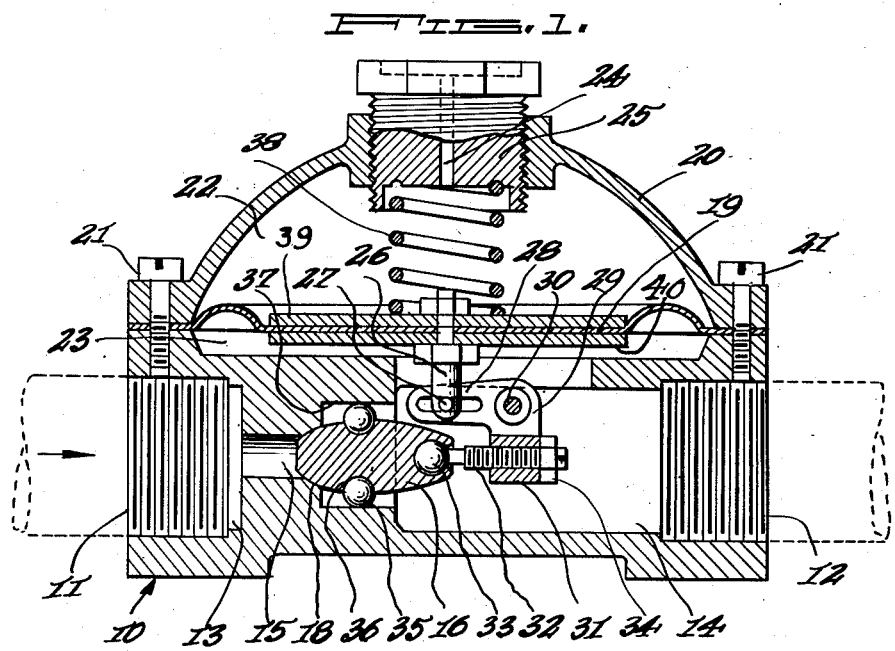
Fig. 1 is a longitudinal vertical sectional view of a fluid pressure regulator constructed in accordance with the invention and showing the valve element in closed relation.
Figure 2:
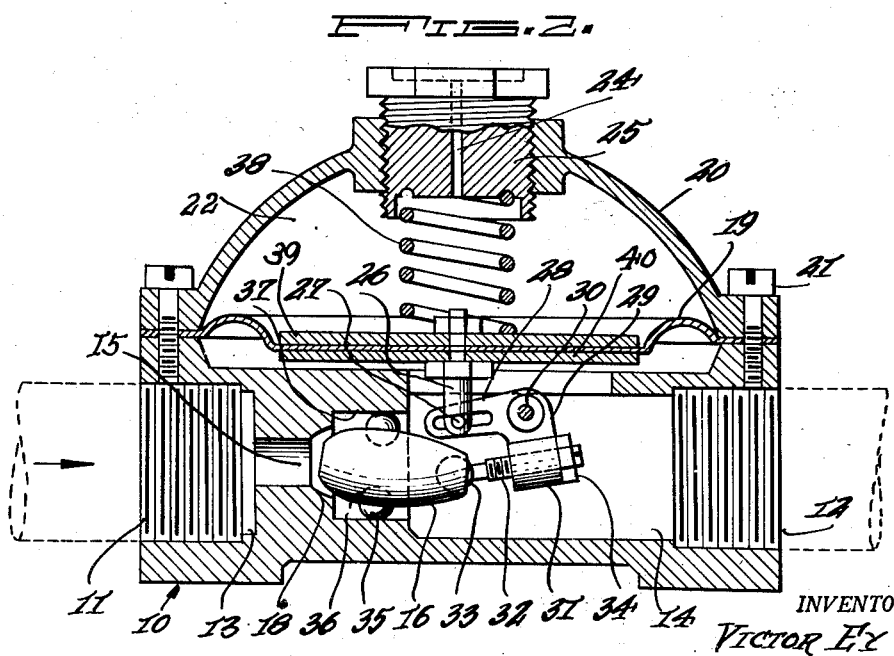
Fig. 2 is a similar view showing the valve element in open relation.

Referring to the drawings by characters of reference the valve includes a valve body 10 provided with inlet and outlet openings 11 and 12 in communication respectively with inlet and outlet chambers 13 and 14 arranged in axial alignment with a valve port 15. A valve element 16 of generally oval formation in cross-sectional configuration and having an arcuate shaped forward end is arranged within the outlet chamber 14 with the forward end thereof disposed for seating engagement with a correspondingly shaped seat 18 surrounding the valve port 15.

The valve element 16 is moved toward and away from the seat 18 by pressure differential on the opposite sides of a diaphragm 19 disposed between the body 10 and the upper portion 20 thereof by means of bolts 21. The diaphragm 19 subdivides the upper portion of the body 10 into upper and lower chambers 22 and 23, the latter chamber being in communication at all times with the outlet chamber 14 while the upper chamber 22 is provided with a vent 24 to the atmosphere through the screw plug 25. Secured to and depending from the diaphragm 19 is a stud 26 having a pin and slot connection 27 at its lower end with the arm 28 of a toggle lever 29 secured to a cross shaft 30 pivoted at its opposite ends in the side walls of the body 10 for rocking movement of the toggle lever.

The depending arm 31 of said toggle lever 29 threadedly receives a screw 32 having a ball and socket connection 23 with the outer end of the valve element 16 for movement thereof toward and away from closed relation with the valve port 15 in response to movement of the diaphragm 19. The screw 32 is arranged with the center of the ball and socket connection 33 disposed below the pivotal center of the cross shaft 30 whereby upward pull on the arm 28 of the toggle 29 will produce an impingement of the rounded forward end of the valve element 16 against its seat 18 as the ball and socket connection 33 approaches dead center or a line extending through the longitudinal axis of the port 15.

The screw 32 is adjustable in the depending arm 31 of the toggle 29 for varying the length thereof so that the distance from the ball and socket connection 33 to the valve seat 18 may be accurately adjusted for correct fitting engagement and impingement of the forward curved end of the valve element with the valve seat and when adjusted the same may be retained in an adjusted position by the lock nut 34.

The valve element 16 is also mounted for guided reciprocatory movement on ball elements 35 mounted for turning movement in sockets 36 in the periphery thereof. The ball elements are spaced apart an angle of 120 degrees in a plane extending transversely through the valve element 16 and have snug rolling engagement with the inner periphery 37 whereby the valve element has reciprocatory movement as well as universal rocking movement about the ball and socket connection 33 and annular rolling movement on the ball elements so as to insure free movement of the valve element and centering of the forward end thereof with reference to the seat 18 when in closed relation to thereby prevent escape of gas or other fluid pressure and avoid sticking or freezing of the valve element.

It will be understood that the ball elements 35 being spaced apart about the periphery of the valve element do not obstruct the free flow of the fluid pressure into the outlet chamber 14, and since the inlet chamber 13, valve port 15 and outlet chamber 14 are in axial alignment the flow of the fluid pressure is in a substantially straight path.

The diaphragm 19 is subjected on the under side thereof to the pressure of the fluid in the outlet chamber 14 and on the opposite side thereof by a coiled expansion spring 38 interposed between the same and the screw plug 25 which is adjustable for varying the tension of the spring 38 on the said diaphragm. Thus, change of pressure in the outlet chamber 14 will cause corresponding movement of the diaphragm 19 to thereby move the valve element 16 toward or away from the seat 18 in relation to the change of pressure. The stud 26 projects upwardly through upper and lower rigid plate members 39 and 40 arranged on opposite sides of the diaphragm 19 centrally thereof with the lower portion of the stud engaging the arm 28 of the lever 29. The stud 26 is bolted or otherwise rigidly secured to the plate members 39 and 40 while the lower end of the expansion spring 38 engages against the upper plate member 39.

What is claimed is:

1. In a valve, a valve closure element, rollable bearings mounted in circumferentially spaced relation about the periphery of said valve element substantially medial of the ends thereof for guided reciprocatory movement toward and away from closed relation and for universal rocking movement of said closure element about an axis extending longitudinally through the center thereof for centering the end of said element on its seat, and a lever pivoted for rocking movement and having an arm provided with an angulated portion connected with said valve element by ball and socket connection for movement of said ball and socket connection from one side to longitudinal alignment of the closure element and the angulated portion of the lever upon rocking movement of the lever and said closure element being disposed in closed relation when in longitudinal alignment with said angulated portion.

2. In a valve, a valve closure element, rollable bearings mounted in circumferentially spaced relation about the periphery of said valve element substantially medial of the ends thereof for guided reciprocatory movement toward and away from closed relation and for universal rocking movement of said closure element about an axis extending longitudinally through the center thereof for centering the end of said element on its seat, a lever, and an arm connected with said valve element by a ball and socket connection and adjustably connected with one end of said lever for varying the length of said arm and said closure element being movable toward and away from closed relation upon rocking movement of said lever.

3. In a valve, a casing having an inlet orifice providing a seat, a passageway extending inwardly in axial alignment with the orifice, a valve element located in said passageway, and rollable bearings mounted in circumferentially spaced relation about the periphery of said valve element substantially medially of the ends thereof and engaging the periphery of said passageway for guided reciprocatory movement of the valve element toward and away from closed relation with said seat and for universal rocking movement of the valve element about an axis extending longitudinally through the center thereof for centering the valve element on said seat.

4. In a valve, a casing having an inlet orifice providing a seat, a passageway extending inwardly of said seat in axial alignment with the orifice, a valve element located in said passageway and having circumferentially spaced sockets in the periphery of said valve element substantially medially of the ends thereof, and rollable bearings mounted in said sockets and engaging the periphery of said passageway for guided reciprocatory movement of the valve element toward and away from said seat and for universal rocking movement of said valve element about an axis extending longitudinally through the center thereof for centering the end of said valve element on said seat.

VICTOR EY.

REFERENCES CITED

The following references are of record in the file of this patent:

UNITED STATES PATENTS

| Number | Name | Date |
|---|---|---|
| 619,206 | Murphy | Feb. 7, 1899 |
| 1,166,350 | Goudard | Dec. 28, 1915 |
| 1,403,263 | Mueller | Jan. 10, 1922 |
| 1,694,595 | Howard | Dec. 11, 1928 |
| 1,922,928 | Cave | Aug. 15, 1933 |
| 1,948,375 | Hoerbiger | Feb. 20, 1934 |
| 2,021,053 | Englebrecht | Nov. 12, 1935 |
| 2,215,419 | Cheeseman | Sept. 17, 1940 |
| 2,308,861 | Clifford | Jan. 19, 1943 |

FOREIGN PATENTS

| Number | Country | Date |
|---|---|---|
| 52,238 | Germany | June 5, 1890 |
| 130,814 | Germany | May 15, 1902 |
| 538,235 | Great Britain | Feb. 1, 1941 |
| 773,601 | France | Aug. 11, 1933 |